(12) United States Patent
Popov

(10) Patent No.: US 6,927,519 B2
(45) Date of Patent: Aug. 9, 2005

(54) ROTOR ASSEMBLY FOR AN ELECTRICAL MACHINE AND PERMANENT MAGNET MOTOR COMPRISING SUCH A ROTOR ASSEMBLY

(75) Inventor: Vladimir Vladimirovich Popov, Königsfeld (DE)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/634,817

(22) Filed: Aug. 6, 2003

(65) Prior Publication Data

US 2004/0095034 A1 May 20, 2004

(30) Foreign Application Priority Data

Nov. 15, 2002 (EP) ............................................ 02025491

(51) Int. Cl.⁷ ................................................ H02K 1/27
(52) U.S. Cl. ............................ 310/156.56; 310/156.47; 310/156.55
(58) Field of Search ...................... 310/156.56, 156.43, 310/156.47, 156.48, 156.49, 156.51, 156.53, 156.55, 156.57

(56) References Cited

U.S. PATENT DOCUMENTS

| 4,405,873 | A | * | 9/1983 | Nondahl | ................ 310/156.56 |
| 5,604,390 | A | | 2/1997 | Ackermann | |
| 5,684,352 | A | | 11/1997 | Mita et al. | |
| 5,962,944 | A | * | 10/1999 | Narita et al. | ............ 310/156.53 |
| 6,008,559 | A | | 12/1999 | Asano et al. | |
| 6,031,311 | A | * | 2/2000 | Lee | ......................... 310/156.57 |
| 6,133,663 | A | | 10/2000 | Hoemann | |
| 6,274,960 | B1 | | 8/2001 | Sakai et al. | |
| 6,441,524 | B2 | | 8/2002 | Kaneko et al. | |
| 6,445,100 | B2 | | 9/2002 | Tajima et al. | |

FOREIGN PATENT DOCUMENTS

| DE | 1995664 | | 10/2000 | |
| EP | 641059 | | 2/1994 | |
| EP | 872944 | | 11/1998 | |
| EP | 1003267 | | 11/1999 | |
| EP | 1100175 | | 10/2000 | |
| EP | 1164684 | | 6/2001 | |
| GB | 1503708 | | 8/1975 | |
| JP | 04285445 A | * | 10/1992 | ............ H02K/1/27 |
| JP | 2000152534 | | 11/1998 | |
| JP | 2001095182 | | 6/2001 | |
| WO | W/O 83/00956 | | 11/1981 | |

* cited by examiner

Primary Examiner—Burton Mullins
(74) Attorney, Agent, or Firm—Duane Morris LLP

(57) ABSTRACT

Rotor assembly for an electrical machine, wherein a body of generally cylindrical shape having an inner opening for coaxially mounting the body on a shaft, permanent magnets embedded in said body, wherein at least one of the permanent magnets is split in at least two magnet sections which extend from about the inner opening towards the outer periphery of the body and are inclined towards a plane, which extends in a radial direction of the body.

21 Claims, 6 Drawing Sheets

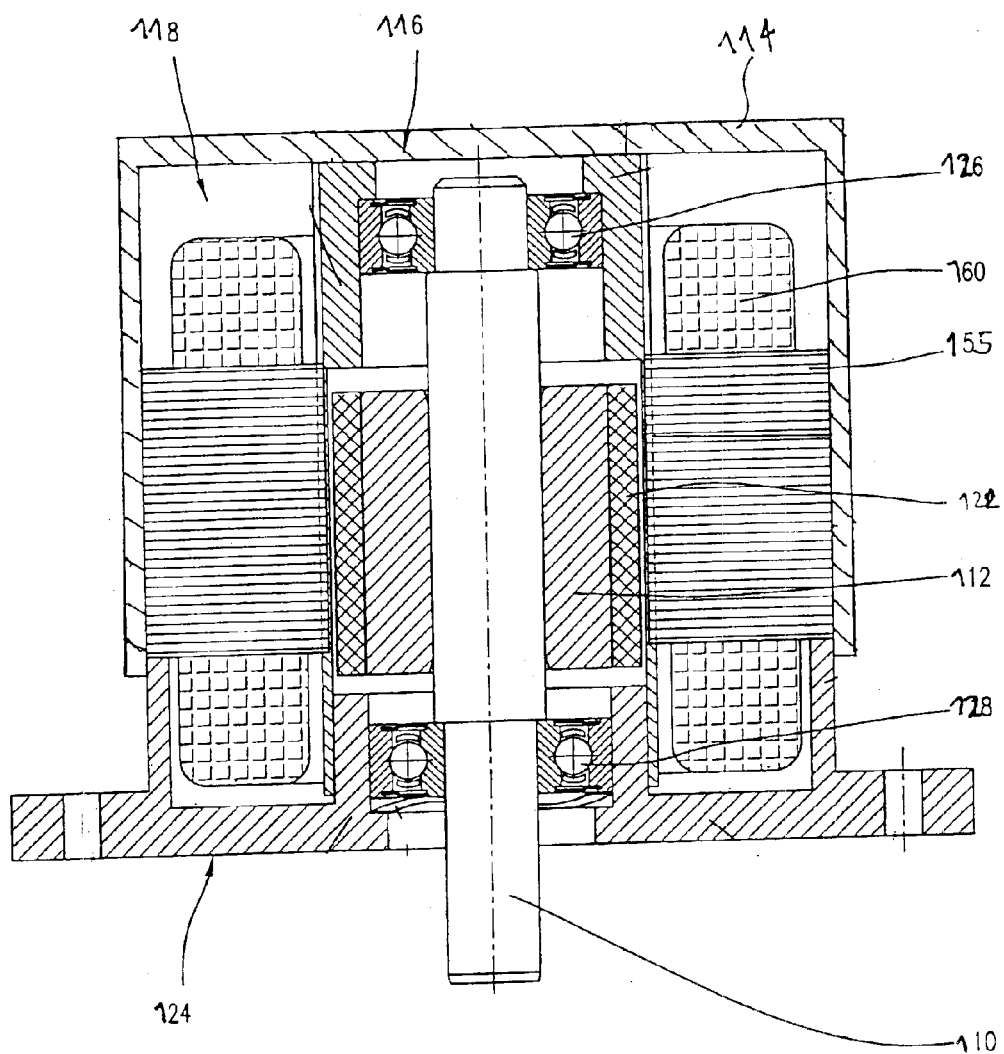
(PRIOR ART) FIG. 5

ROTOR ASSEMBLY FOR AN ELECTRICAL MACHINE AND PERMANENT MAGNET MOTOR COMPRISING SUCH A ROTOR ASSEMBLY

BACKGROUND OF THE INVENTION

The present invention relates to a rotor assembly for an electrical machine and a P.M. (Permanent Magnet) motor comprising such a rotor assembly. In general, the invention relates to the field of brushless D.C. and P.M. synchronous motors comprising permanent magnets which can be configured to include an interior rotor surrounded by a stator (Innenläufermotor) or on outer rotor configuration (Außenläufermotor). Electrical machines having an interior rotor include a rotor assembly which is mounted on the shaft and one or more permanent magnets as well as a stator assembly, such as a stator laminated from a number of metal sheets, comprising windings. The rotor assembly is coaxially inserted into the stator assembly. In electrical machines having outer rotors the rotor assembly surrounds the stator.

FIG. 5 schematically shows the general design of an electrical machine, comprising a housing 114, in which are included the stator assembly 118, the rotor assembly 116 as well as bearings 126, 128 for rotatably supporting the rotor assembly. The stator assembly 118 comprises sheet metals 155 and windings 160 and defines an interior cavity into which the rotor assembly 116 can be inserted. The rotor assembly 116 includes the shaft 110, a yoke 112 and permanent magnets 122. The bearings 126, 128 for the rotor assembly can be integrated into a flange 124 of the motor housing 114.

More particularly, the present invention relates to a rotor assembly for an electrical machine, comprising a body of generally cylindrical shape having an inner opening for coaxially mounting the body on a shaft, and permanent magnets embedded in said body.

Rotors including embedded magnets have been generally known and described in the art. A rotor configuration having a multi-pole "spoke" design with radially extending embedded magnets, enclosed by a retaining ring is shown e.g. in "Design of Brushless Permanent-Magnet Motors" J. R. Hendershot Jr. and T J E Miller, Magna Physics Publishing and Clarendon Press, Oxford, 1994. As shown therein, it is known to have a rotor body with embedded, radially extending magnets which are protected by a ring or tube surrounding the rotor body. The rotor body in which the magnets are embedded has the function of a yoke.

A common form of burried magnets is shown in EP 0 641 059 B1 and EP 0 691 727 B1. These references show a plurality of magnets which are inserted into slots which are formed in the outer rotor surface. With the design disclosed in these references, stray flux is created which passes through the rotor back-iron close to the shaft. Accordingly, magnet energy dissipated in this area can't be used efficiently. Document DE 101 00 718 A1 discloses a similar design wherein the permanent magnets are inserted into slots in the rotor body which are closed at the outer rotor surface. Thereby, the rotor is divided into wedges which need to be mounted on a frame.

WO 00/57537 describes a multipole, permanent-magnet rotor for a rotating electrical machine, manufactured with embedded magnets in a so-called "flux-concentrating style". In the rotor configuration shown in this reference permanent magnets are designed as flat cubes which are arranged in a direction radial to the rotor axis in groove-like gaps between yoke sections fixed in the rotor body. For easily mounting the magnets this document proposes to divide a yoke into two adjacent half-yokes of two poles, wherein magnets are arranged there between to form a pole element which can be fixed independently on the rotor body.

EP 0 872 944 A1 shows another design of a rotor having embedded permanent magnets wherein the magnets are arranged in a radial direction or parallel to a radial direction of the rotor body.

A similar design is shown in EP 0 803 962 B1. The rotor is made of a ferromagnetic material body defining a plurality of radially by extending slots in which are engaged the permanent magnets so as to provide the desired numbers of poles for the rotor. The slots for receiving the permanent magnets are designed with a bridge at the outer periphery of the rotor body and an opening at the inner diameter of the rotor body so that the permanent magnets can be inserted and held in said slots. Trapezoidal elements of the rotor body which are separated by the radially extending slots will form the poles of the rotor.

Further patent documents showing a rotor having embedded magnets are GB 1,177,247, EP 0 955 714 A2, and U.S. 2002/0,067,096 A1.

The preferred application of the rotor assembly according to the present invention is in a brushless D.C. motor or P.M. synchronous motor. Such motors can be used in a wide range of applications such as spindle motors for disc drives, electrical motor power assisted systems in automobiles, e.g. steering and braking systems, power tools and many other applications.

With the radial arrangement of the permanent magnets, as shown and described in the prior art, a problem may arise in that the regular arrangement of the permanent magnets produces a cogging torque effect which is disadvantageous in the operation of the motor. In a rotor assembly having surface-magnets, it is known to provide a skewed magnet arrangement to avoid abrupt switching between phases and thus to reduce a cogging torque, as disclosed e.g. in the above mentioned reference of Hendershot and Miller. Skewed magnetization of the rotor poles, however, creates an axial component of the magnetic force and thus a loss of torque. Further, the problem of the cogging torque produced during operation of the electrical motor has not yet been solved satisfactorily for rotors having embedded magnets of the type described above.

It is therefore an object of the present invention to provide a rotor assembly having embedded magnets which can improve the efficiency of the electrical machine and, in particular, eliminate or reduce the cogging torque.

SUMMARY OF THE INVENTION

This object is solved by a rotor assembly comprising the features of claim 1.

According to the present invention a rotor assembly for an electrical machine is provided, comprising a body of generally cylindrical shape having an inner opening, and permanent magnets embedded in said rotor body. At least one of the permanent magnets is split in at least two magnet sections which extend from about the inner opening of the body towards the outer periphery of the body. The two magnet sections are inclined towards a plane which extends in a radial direction of the body. Preferably, each permanent magnet is split in two magnet sections. The rotor assembly of the present invention can be configured to form an inner rotor or an outer rotor.

By splitting one or more of the permanent magnets in at least two magnet sections and inclining said magnet sections toward a plane which extends in a radial direction of the body, it is possible to control the magnetic flux and thus the shape of the induction in the air-gap between the rotor and the stator. As a consequence, it is possible to achieve a torque concentration effect and/or reduce cogging torque. The best torque concentration and lower cogging phenomenon is generally achieved by different magnets disposition. However, it is possible to achieve both by the same disposition in some cases.

While the prior art arrangements of embedded magnets provided for only two degrees of freedom for controlling motor parameters, such as the radial distribution of the electromagnetic induction in the air-gap and flux concentration, namely the width of a magnet and the length of a magnet, the present invention allows four parameters for motor optimisation. According to the present invention, the motor can be tuned as a function of the length of a magnet, the width of a magnet, the distance between the magnet sections, and the angle of inclination of each magnet section. Therefore, it is easier to influence the flux concentration and distribution of electromagnetic induction in the air-gap as with the arrangements according to the prior art. By optimising the arrangement of the magnet sections it is possible to reduce the cogging torque without the necessity of any skewing or shifting technique which have been used in the prior art. By choosing different distances between the magnetic sections and/or different inclination angles of the magnet sections, the shape of the radial component of the electromagnetic induction distribution can be varied over the circumference of the air-gap. These parameters also have an influence on the flux concentration in the air gap.

According to the present invention, the two sections of one permanent magnet are inclined towards a neutral line (or plane) of the magnet which is the central line (or plane) of the neutral zone in the middle between two magnet sections which extends in a radial direction of the rotor assembly. The angle of inclination between two magnet sections of one permanent magnet is defined to be $\alpha$. In case of more than two magnet sections, $\alpha$ is the angle between the two outer sections of one split magnet. The inclination angle $\alpha$ can be zero, if the magnet sections are parallel to each other. The angle $\alpha$ is defined to be positive when the two magnet sections converge towards the outer periphery of the rotor assembly; the angle $\alpha$ is defined to be negative when the two magnet sections converge towards the centre of the rotor assembly. Experiments have shown that good results are achieved with an angle $\alpha$ of between about 14 and 34 degrees and more preferably of about 20 degrees.

The present invention is not limited to the described type of arrangement of the magnet sections. The two or more sections of one magnet can be inclined at different angles. They can be converging towards the outer periphery of the rotor assembly or towards its inner opening. Further, each magnet can be split in more than two magnet sections and there can be some magnets which are not split at all—all depending on the specific demands for influencing the distribution of the electromagnetic induction in the air-gap and the flux concentration effect in the air gap.

In a further preferred embodiment, the magnet section of each permanent magnet is shifted by an angle $\beta$ from the neutral line of the magnet, wherein $\beta$ is measured at the inner ends of the permanent magnets, near the inner opening of the body. The angle $\beta$ can be anywhere between 0 and 90 electrical degrees.

An expert will understand that the shift distance of the magnet sections and the inclination angle between magnet sections depend on the specific requirements of the application.

By changing the inclination angle $\alpha$ it is very easy to change the size of the pole arc along the outer periphery of the rotor and thus the density of the magnetic flux, or flux concentration, going through this pole. The main function of the angle $\beta$, separating the magnet sections, is the control of the cogging torque. It is possible to achieve a low cogging torque by suitably adjusting the angle $\beta$. However, the specific value of this angle depends on the whole construction of the magnet core. An expert will be able to find the best angle $\beta$ with undue experimentation. Angle $\beta$, additionally, limits the stray flux in the zone between the magnet sections. Small values of $\beta$ lead to a smaller stray flux and vice versa.

In a particularly advantageous embodiment of the invention, slots are provided in the body for receiving the magnet sections, the slots extending from the inner opening of the body towards the outer periphery of the body. In particular, the slots are closed at the outer periphery of the body so as to protect the magnets against mechanical and electromagnetic damage under operation. The provision of slots for receiving the magnets which are closed towards the air-gap side makes it possible to protect the magnets by a bridge against any possible mechanical damage. As the magnets are protected by the rotor body itself, there is no need for an additional retaining tube surrounding the motor and keeping the magnets in place. As a consequence, the size of the air-gap can be reduced. As there is no (metal) retaining tube provided around the rotor body, the size of the air-gap can be reduced, and the energy from the magnet can be transferred more efficiently to the stator so that there is less energy loss and a more effective motor can be achieved.

As a consequence, the volume of magnetic material can be reduced when compared with a surface magnet designed under equal conditions otherwise. Accordingly, with the proposed arrangement of the magnet sections in slots which are closed at the outer periphery of the body the overall efficiency of the motor can be increased.

The present invention provides for a rotor assembly wherein the rotor body forms a magnetic core, with magnets embedded therein. Preferably, the inner opening of the rotor body is configured for mounting the rotor body on a shaft. In particular the body is mounted on the shaft via a hub. The hub should be made of a non magnetic material.

In an alternative embodiment, the rotor body is configured to surround a stator of the electrical machine, with an air-gap being formed between the rotor and the stator.

In the arrangement according to the present invention a neutral zone is created between the magnet sections of one permanent magnet and a rotor pole is formed between two adjacent permanent magnets. In one particular embodiment of the invention, the outer periphery of the body has a convex shape between two adjacent permanent magnets. This serves as an additional measure to control the distribution of the radial component of the electromagnetic induction. In general, the magnetic poles formed between two adjacent permanent magnets can have different shapes to control the distribution of the electromagnetic induction and in particular, different convex shapes.

SHORT DESCRIPTION OF THE DRAWINGS

In the following, the invention is described by way of preferred embodiments of the invention with reference to the drawings.

FIG. 5 shows a schematic sectional view in a longitudinal direction through a D.C. motor according to the prior art.

DESCRIPTION OF THE PREFERRED EMBODIMENTS

Figure 1:
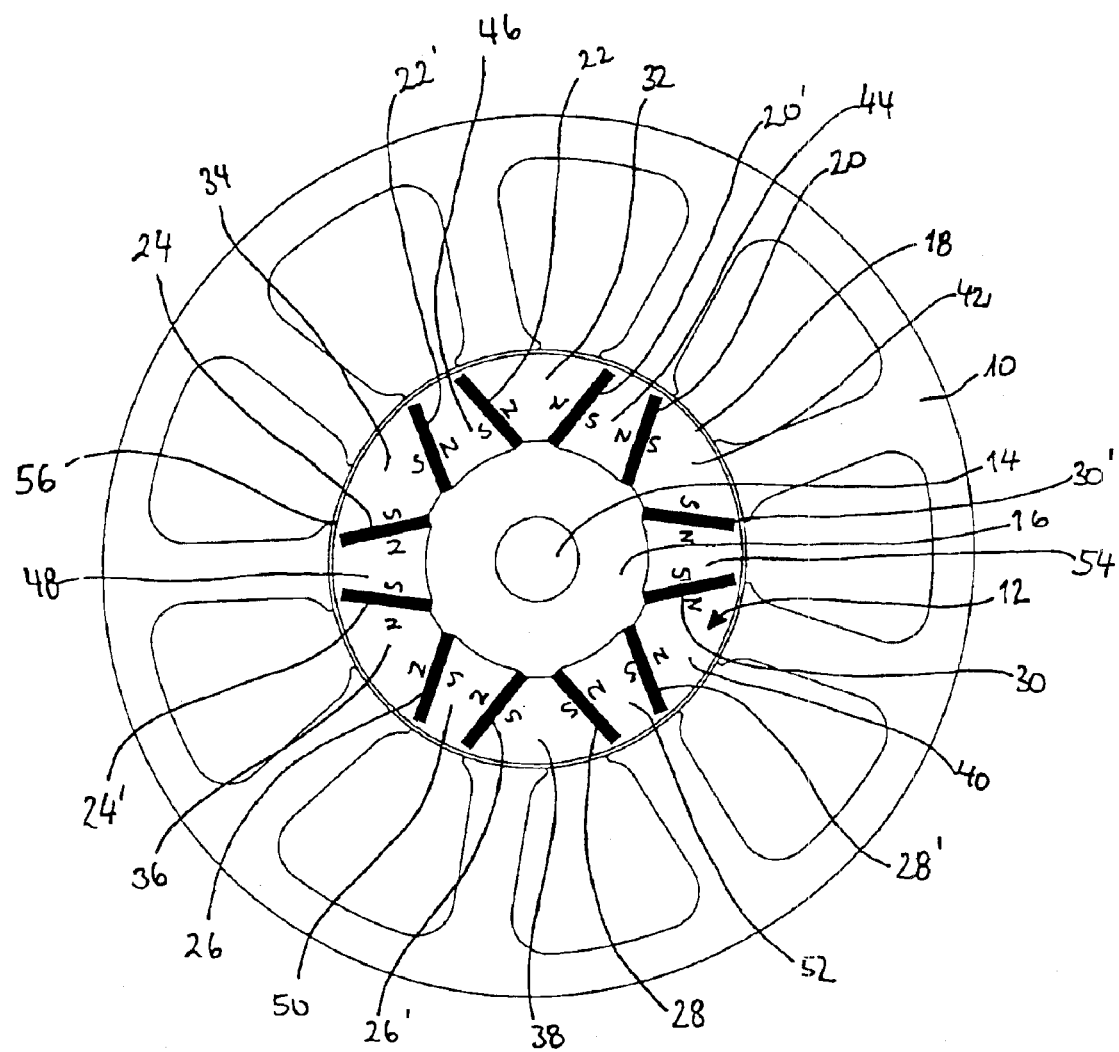
FIG. 1 shows a schematic sectional view through a motor comprising a stator and a rotor assembly according to the present invention.

FIG. 1 schematically shows a sectional view through a brushless P.M. (Permanent Magnet) motor according to the present invention. The motor comprises a stator 10 and a rotor assembly 12 according to the present invention. The rotor assembly 12 is mounted on a shaft 14 via a hub 16. The rotor assembly 12 comprises a rotor body 18 comprising a magnetic core and a yoke and magnet sections 20, 20'; 22, 22'; 24, 24'; 26, 26'; 28, 28'; 30, 30'. Each pair of magnet sections 20, 20'; 22, 22'; 24, 24'; 26, 26'; 28, 28'; 30, 30' forms one permanent magnet of the rotor assembly 12, with magnetic poles 32, 32, 34, 36, 38, 40, 42 formed between the magnets and neutral zones 44, 46, 48, 50, 52, 54 formed between each pair of magnet sections. The magnetisation of the core material of the rotor body 18 is indicated by N (north) and S (south) in the drawing.

Further, an air-gap 56 is provided between the stator 10 and the rotor body 12. An expert will understand that a brushless P.M. motor comprises further components, such as windings, a housing, electric and electronic control components etc., as shown in FIG. 5.

Figure 2:
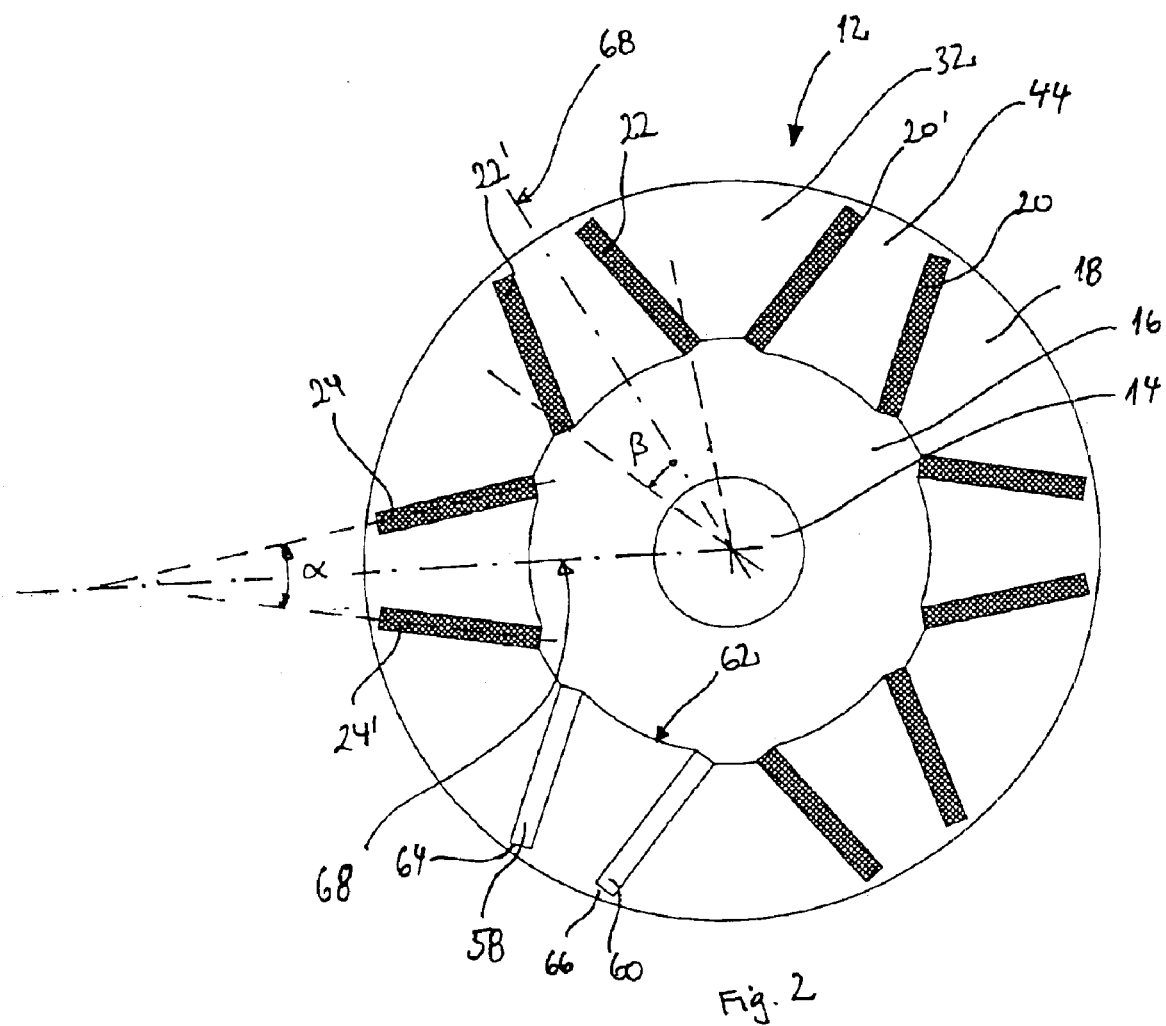
FIG. 2 shows a schematic sectional view through a rotor assembly according to the present invention.

The invention is described with further detail with reference to FIG. 2 which shows an enlarged view of the rotor assembly according to the present invention. The same components as in FIG. 1 are designated with the same reference numbers. For clarity reasons, the reference numbers of the magnet sections 26, 26'; 28, 28'; 30, 30', of the poles 32 to 42 and of the neutral zones 46 to 54 are omitted.

The rotor body 18 form a magnetic core including a yoke and, accordingly, is made from a material having suitable magnetic properties. The hub 16 preferably is made from a non-magnetic material; and also the shaft 14 should be made from a non-magnetic material. However, the shaft can be made from a magnetic material if the thickness of the hub is sufficiently large.

The magnet sections 20, 20'; 22, 22'; 24, 24'; 26, 26'; 28, 28'; 30, 30' are provided in slots 58, 60 which are formed in the rotor body 18. The slots 58, 60 are open at the inner diameter 62 of the rotor body 18 and they are closed by relatively thin bridges 64, 66 at the outer diameter of the rotor body 18. The magnet sections 20, 20'; 22, 22'; 24, 24'; 26, 26'; 28, 28'; 30, 30' can be inserted into the slots 60, 64 from the inner side 62 of the rotor body 18 and are securely held therein. The bridges 64, 66 at the outer diameter of the rotor body 18 protect the magnet sections 20, 20'; 22, 22'; 24, 24'; 26, 26'; 28, 28'; 30, 30' against any mechanical and electromagnetic damage. As these bridges conduct the biggest protion of stray flux, it is important to carefully define the thickness of these bridges 64, 66 to satisfy the requirements regarding both mechanical stability and stray flux.

As shown in FIG. 2, the two magnet sections of each magnet, such as 24, 24', are inclined towards the neutral line or plane (schematically shown at 68) which extends radially through the rotor body 18, by the angle $\alpha$. Further, the two magnet sections are shifted by the angle $\beta$ near the inner diameter 62 of the rotor body 18. By varying the parameters $\alpha$ and $\beta$ as well as the length and width of each magnet section it is possible to adjust the properties of the motor and in particular the radial distribution of the electromagnetic induction in the air-gap as well as the flux concentration. By suitably inclining and dispositioning the magnet sections 22, 22' the cogging torque can be reduced and a more even operation of the motor can be obtained. Further, flux can be concentrated and thus torques can be concentrated so that a more effectively operating motor is obtained.

FIG. 3 shows a modification of the rotor assembly according to the present invention. The same components are designated by the same reference numbers used in FIG. 2.

Figure 3A:
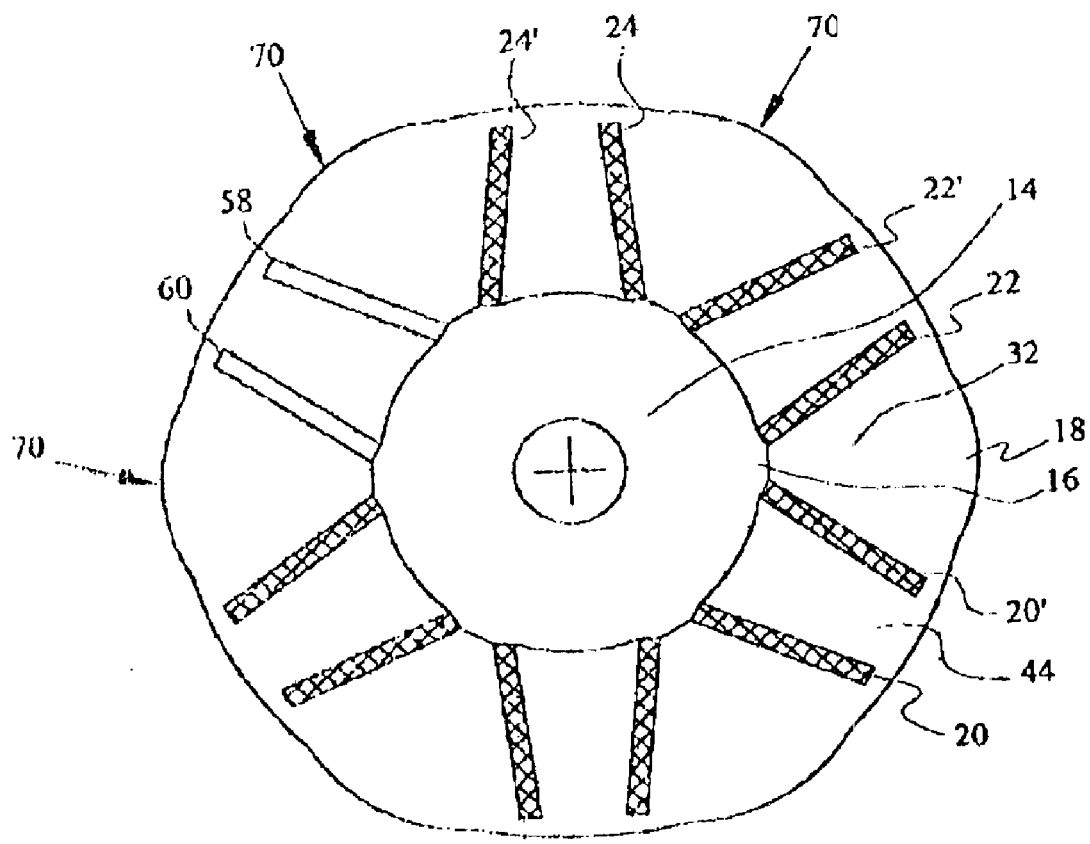
FIGS. 3A and 3B show schematic sectional views through a rotor assembly according to further embodiments.
Figure 3B:
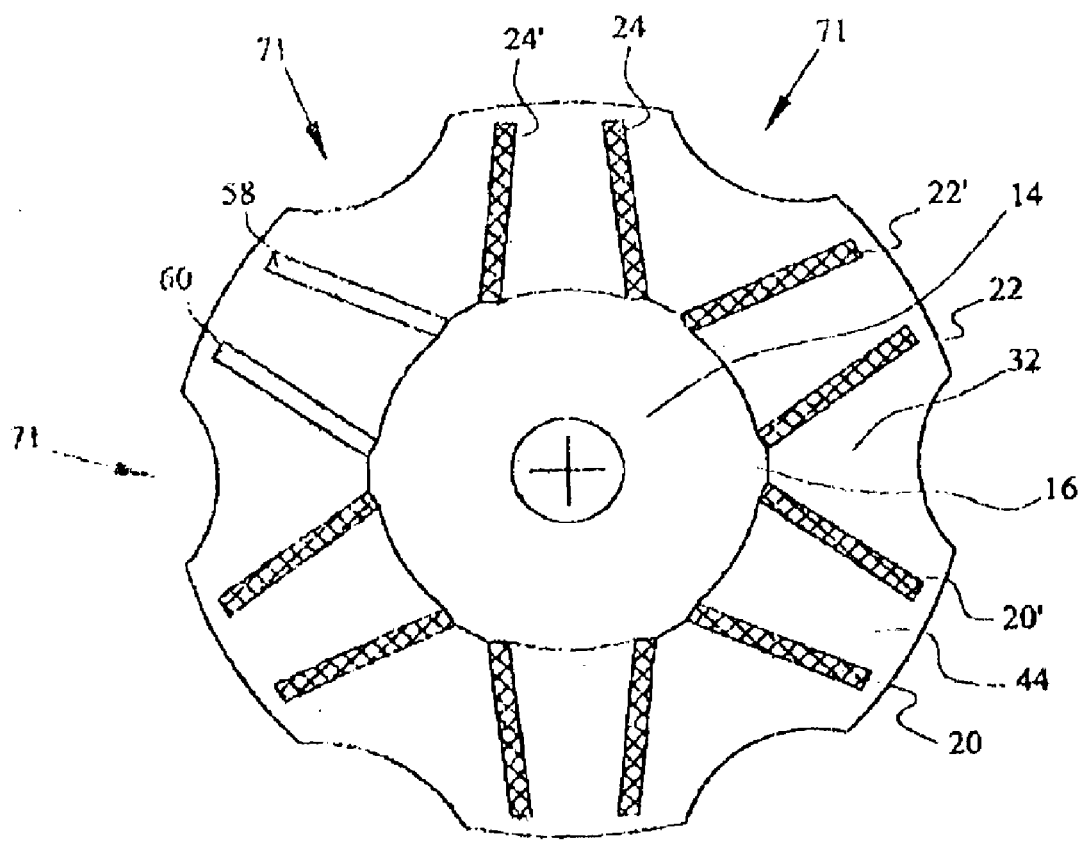

The difference between the embodiments of FIG. 2 and FIG. 3 is that the poles 32 to 42 of the rotor body, between the magnets 20, 20'; 22, 22'; 24, 24'; 26, 26'; 28, 28'; 30, 30' are provided with a convex shape 70 as shown in FIG. 3A. Alternatively, the outer shape can also be concave as shown in FIG. 3B. The shape of the rotor is a further measure to control the distribution of the radial component of the electromagnetic induction on the air-gap.

Figure 4:
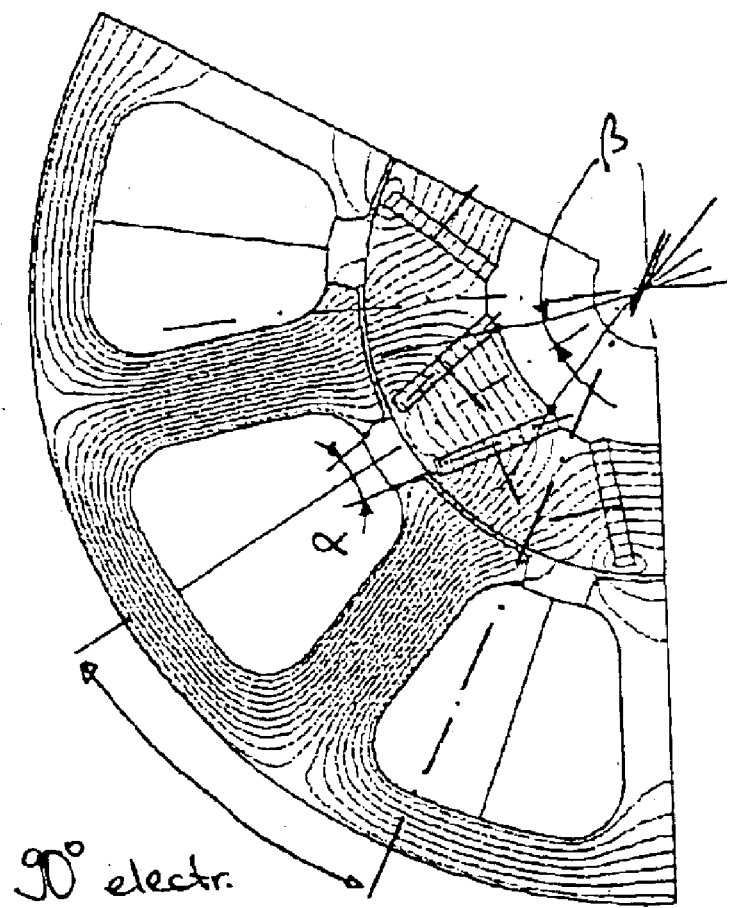
FIG. 4 shows a schematic sectional view through part of the motor of FIG. 1 wherein the magnetic flux is indicated.

FIG. 4 schematically shows a sectional view through part of the motor of FIG. 1, wherein the magnetic flux, passing through the rotor 12 and the stator 10 is indicated by fine lines. From the drawing of FIG. 4 an expert will understand that by changing the inclination angle $\alpha$ between two magnet sections it is possible to change the size of the pole arc 32 to 42 and thus the density of the magnetic flux going through this pole. It has been found that the preferred values of $\alpha$ lay between 14 and 34 degrees. An expert will understand that each pole is formed by the surface area on the rotor delimited by lines of change of flux direction. In the present case of burried magnets, one pole is a zone between two neighbouring magnet sides being magnetised with equal sign (e.g. between two northern pole sides). FIG. 4 also shows that there is a neutral zone 44 to 54 between the magnet sections.

The features disclosed in the above specification, the claims and the drawings can be relevant for implementing the various embodiments of the present invention when taken alone or in any combination thereof.

LIST OF REFERENCE NUMBERS

10 Stator
12 Rotor assembly
14 Shaft
16 Hub
18 Rotor body
20, 20', 22, 22', 24, 24', 26, 26'; 28, 28'; 30, Magnet sections
32, 34, 36, 38, 40, 42 Magnetic poles
44, 46, 48, 50, 52, 54 Neutral zones
56 Air-gap
58, 60 Slots
62 Inner diameter
64, 66 Bridges
68 Split magnet neutral line
70 Convex Shape
110 Shaft
112 Yoke
114 Housing
116 Rotor assembly
118 Stator assembly
122 Permanent magnets
124 Flange
126, 128 Bearing
155 Sheet metals 160 Windings

What is claimed is:

1. A magnetic motor comprising:
    a housing for receiving a stator and a rotor assembly;
    the rotor assembly having a generally cylindrical body with an inner opening and an outer periphery, the body having a plurality of apertures formed therein for receiving permanent magnets, each aperture extending from about the inner opening to about the outer periphery and the apertures being open at the inner opening and closed at the outer periphery, a pair of adjacent apertures forming an inclination angle therebetween such that the circumferential distance between the adjacent apertures is shorter about the outer periphery of the body than about the inner periphery of the body.

2. A rotor assembly for an electrical machine comprising:
    a body of generally cylindrical shape having an inner opening and an outer periphery, said inner opening configured for coaxially mounting said body on a shaft;
    a plurality of permanent magnets;
    a plurality of slots provided in the body for receiving said plurality of permanent magnets, said slots extending from the inner opening towards the outer periphery of the body, wherein the slots are open at the inner opening of the body and are closed at the outer periphery of the body;
    wherein a pair of adjacent slots form an inclination angle therebetween such that the circumferential distance between the adjacent slots is shorter about the outer periphery than about the inner periphery of the body.

3. A rotor assembly for an electrical machine comprising:
    a body of generally cylindrical shape having an inner opening and an outer periphery;
    the body having a plurality of apertures formed therein for receiving permanent magnets, each aperture extending from about the inner opening to about the outer periphery of the body and the apertures open at the inner opening of the body and closed at the outer periphery of the body, each aperture separated by a section of the body from an adjacent aperture;
    wherein a pair of adjacent apertures form an inclination angle therebetween such that the circumferential distance between the adjacent apertures is shorter about the outer periphery of the body than about the inner opening of the body.

4. A rotor assembly according to claim 3 wherein said inner opening is configured for coaxially mounting said body on a shaft.

5. A rotor assembly according to claim 4 wherein said body is mounted on said shaft by a hub.

6. A rotor assembly according to claim 5 wherein said hub comprises a non-magnetic material.

7. A rotor assembly according to claim 3 wherein at least one of said pair of adjacent apertures are inclined towards a magnetic neutral line by an angle $\alpha$.

8. A rotor assembly according to claim 7 wherein said angle $\alpha$ is between about 14 and 34 degrees.

9. A rotor assembly according to claim 8 wherein said angle $\alpha$ is 20 degrees.

10. A rotor assembly according to claim 7 wherein each aperture is shifted by an angle $\beta$ from its respective magnetic neutral line as measured from an inner end of the magnet section closest to the inner opening.

11. The method rotor assembly of claim 10 wherein the angle $\beta$ is between 0 and 90 degrees.

12. A rotor assembly according to claim 3 wherein said rotor body comprises a magnetic core.

13. A rotor assembly according to claim 3 wherein a magnetic neutral zone is formed between said sections of the body separating adjacent apertures and a pole is formed between two adjacent permanent magnets.

14. A rotor assembly according to claim 13 wherein the outer periphery of said body has a convex shape between two adjacent permanent magnets.

15. A rotor assembly according to claim 13 wherein the outer periphery of said body has a concave shape between the pair of adjacent apertures.

16. A method for improving the performance of a permanent magnet motor having a stator assembly and a rotor assembly, the method comprising:
    providing a rotor body having a plurality of apertures, each of the plurality of apertures adapted to receive a permanent magnet and each aperture extending from an inner opening of the rotor body toward the outer periphery of the rotor body, the apertures being open at the inner opening of the rotor body and closed at the outer periphery of the rotor body;
    inserting a plurality of permanent magnets in each of the apertures; and
    positioning the rotor and the stator assemblies in a motor;
    wherein a pair of adjacent apertures form an inclination angle therebetween such that the circumferential distance between the adjacent apertures is shorter about the outer periphery than about the inner opening of the body.

17. The method of claim 16 wherein the inclination angle is between 14 and 34 degrees.

18. The method of claim 16 wherein the inclination angle is about 20 degrees.

19. A rotor assembly for an electrical machine comprising:
    a body of generally cylindrical shape having an inner opening (14) and an outer periphery;
    a plurality of permanent magnets embedded in said body;
    wherein at least one of said plurality of permanent magnets is split into at least two magnet sections which extend from about the inner opening towards the outer periphery of said body and said at least two magnet sections are inclined towards a magnetic neutral line and said magnetic neutral line extends in a radial direction of the body;
    wherein a plurality of slots are provided in the body for receiving said plurality of permanent magnets, said slots extending from the inner opening (14) towards the outer periphery of the body, wherein the slots are open at the inner opening of the body and are closed at the outer periphery of the body;
    wherein a magnetic neutral zone is formed between said at least two magnet sections and a pole is formed between two adjacent permanent magnets; and
    wherein the outer periphery of said body has a concave shape between two adjacent permanent magnets.

20. A rotor assembly for an electrical machine comprising:
    a body of generally cylindrical shape having an inner opening (14) and an outer periphery;
    a plurality of permanent magnets embedded in said body;
    wherein at least one of said plurality of permanent magnets extends from about the inner opening to the outer periphery of said body and is inclined towards a magnetic neutral line which extends in a radial direction of the body;

a plurality of slots are provided in the body for receiving said plurality of permanent magnets, said slots extending from the inner opening (14) towards the outer periphery of the body, wherein the slots are open at the inner opening of the body and are closed at the outer periphery of the body;

wherein the outer periphery of said body has a concave shape between two adjacent permanent magnets.

21. A method for improving the performance of a permanent magnet motor having a stator assembly and a rotor assembly, the method comprising:

providing a rotor body having a plurality of apertures, each of the plurality of apertures adapted to receive a permanent magnet and each aperture extending from an inner opening of the rotor body toward the outer periphery of the rotor body, the apertures being open at the inner opening of the rotor body and closed at the outer periphery of the rotor body;

inserting one of said plurality of permanent magnets in each of the apertures;

separating at least one of the plurality of permanent magnets into at least two magnetic sections, a magnetic neutral line defining a line between the two magnetic sections; and positioning the rotor and the stator assemblies in a motor;

wherein at least two of the apertures are positioned to form an angle $\alpha$ between the permanent magnets positioned therein, the angle $\alpha$ defining a neutral line between said permanent magnets; and wherein the outer periphery of said body has a concave shape between two adjacent permanent magnets.

* * * * *